US006801789B1

(12) United States Patent
Kato

(10) Patent No.: US 6,801,789 B1
(45) Date of Patent: Oct. 5, 2004

(54) MULTIPLE-BEAM ANTENNA

(75) Inventor: Masahiro Kato, Nagaokakyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/493,181

(22) Filed: Jan. 28, 2000

(30) Foreign Application Priority Data

Feb. 1, 1999 (JP) ........................................... 11-023620

(51) Int. Cl.[7] ................................................ H04M 1/00

(52) U.S. Cl. .................... 455/562.1; 333/208; 343/776; 343/380

(58) Field of Search ................................ 455/562, 427, 455/12.1, 13.1; 343/840, 781 R, 756, 786; 342/188; 333/26, 248, 249

(56) References Cited

U.S. PATENT DOCUMENTS

| | | | | |
|---|---|---|---|---|
| 4,568,943 A | * | 2/1986 | Bowman | 343/756 |
| 4,707,702 A | * | 11/1987 | Withers | 343/786 |
| 5,086,301 A | * | 2/1992 | English et al. | 342/188 |
| 5,276,410 A | * | 1/1994 | Fukuzawa et al. | 333/21 A |
| 5,434,586 A | * | 7/1995 | Kinoshita et al. | 343/840 |
| 5,696,519 A | * | 12/1997 | Suzuki et al. | 310/268 |
| 5,796,371 A | * | 8/1998 | Sato et al. | 343/786 |
| 6,101,297 A | * | 8/2000 | Nakaya | 385/3 |
| 6,121,939 A | * | 9/2000 | Imaizumi et al. | 343/840 |
| 6,356,170 B1 | * | 3/2002 | Arakawa et al. | 333/208 |

FOREIGN PATENT DOCUMENTS

| | | |
|---|---|---|
| JP | 6-283912 | 10/1994 |
| JP | 6-283913 | 10/1994 |
| JP | 10-145138 | 5/1998 |
| JP | 10-163737 | 6/1998 |
| JP | 10-173562 | 6/1998 |
| JP | 10-261902 | 9/1998 |

* cited by examiner

*Primary Examiner*—Charles Appiah
*Assistant Examiner*—Joy K. Contee
(74) *Attorney, Agent, or Firm*—Nixon & Vanderhye P.C.

(57) ABSTRACT

A multiple-beam antenna is provided which is capable of receiving radio waves from two satellites by one down converter and readily adjusting a polarization displacement due to a locational difference in receiving areas. Probes for vertically and horizontally polarized waves are inserted to two circular waveguides corresponding to signals from two satellites. One end of each probe is bent to have an angle for adjustment of the polarization displacement where it is installed. The other end of each probe is mounted on a board of a down converter via a through hole.

3 Claims, 7 Drawing Sheets

MULTIPLE-BEAM ANTENNA

BACKGROUND OF THE INVENTION

1. Field of the Invention

The present invention relates to multiple-beam antennas. More specifically, the present invention relates to a multiple-beam antenna provided with a low noise down converter receiving signals from a plurality of communications satellites for amplification and frequency conversion, and outputting the signals to a tuner circuit.

2. Description of the Background Art

In satellite broadcasting or satellite communication, a radio wave output from a satellite is transmitted in the form of a circularly polarized wave or linearly polarized wave. The radio wave is converted to mutually orthogonal horizontally and vertically polarized-waves by a low noise down converter and input to a tuner circuit.

In satellite broadcasting, a circularly polarized wave is employed as there is no need to consider polarization displacement resulting from a geometrical relationship with respect to a receiving point on the earth. In satellite communication, however, a linearly polarized wave is employed which is orthogonal to vertically and horizontally polarized waves.

FIG. 5 is an illustration showing a conventional parabolic antenna receiving a radio wave output from a satellite. The radio wave output from the satellite and having vertical and horizontal planes of polarization is reflected by parabolic antenna 1 and input to a down converter 2. Down converter 2 includes a circular waveguide 3 as shown in FIG. 6. The radio wave is input to an opening of circular waveguide 3, converted to a linearly polarized wave, and fed to a circuit board (not shown). A reflecting bar 4 is provided inside circular waveguide 3 shown in FIG. 6, and probes 5 and 6 are also inserted to circular waveguide 3. The vertically polarized wave is reflected by reflecting bar 4 and output to probe 6, whereas the horizontally polarized wave is directly output to probe 5.

In adjusting polarization displacement using circular waveguide 3 shown in FIG. 6, feeding probes 5, 6 and circular waveguide 3 are orthogonally arranged. The polarization displacement is adjusted by rotating down converter 2 which is integrally formed with waveguide 3, as shown in FIG. 7, when mounting down converter 2 to parabolic antenna 1.

FIG. 8 is a diagram shown in conjunction with a multiple-beam antenna. Referring to FIG. 8, radio waves transmitted from two satellites 10 and 11 are reflected by parabolic reflector 8 and received by one low noise block down converter (hereinafter abbreviated as LNB) 9, which is supported by parabolic reflector 81 through a supporting arm 82. The received signals from two satellites are switched by a signal selected by a tuner. Each of the radio waves transmitted from two satellites has a different focal point, so that a waveguide is provided at the input portion for each satellite in LNB 9 for separation of radio waves.

FIG. 9 shows a multiple-beam LNB integrally formed with the waveguide. As shown in FIG. 8, an entire system allowing reception of the radio waves from a plurality of satellites 10, 11 by one LNB 9 is referred to as a multiple-beam antenna. Particularly, the waveguide of LNB 9 used in multiple-beam antenna 8 must separate the received radio waves from satellites 10, 11 into mutually orthogonal horizontally and vertically polarized waves, so that each polarized wave can be transferred and supplied to a circuit portion on the board with a small amount of loss.

However, as shown in FIG. 9, waveguides 31, 32 corresponding to satellites 10, 11 are integrated by the substrate. Thus, as described with reference to FIG. 7, it is difficult to adjust polarization displacement by separately rotating each of circular waveguides 31, 32.

SUMMARY OF THE INVENTION

Therefore, a main object of the present invention is to provide a multiple-beam antenna capable of receiving radio waves from a plurality of satellites by one down converter and readily adjusting polarization displacement at a receiving location.

In short, the present invention is a multiple-beam antenna receiving radio waves from a plurality of satellites by one down converter mounted on a parabolic reflector and switching the input signals by a signal selected by a tuner for output. The down converter includes a plurality of waveguides receiving at its opening the radio waves from the plurality of satellites and converting them to linearly polarized waves, and a feeding portion inserted to each waveguide and having its one end bent to have a prescribed angle for adjusting the polarization displacement.

Therefore, according to the present invention, the polarization displacement inherent to a locational difference can be adjusted without any decrease in performance, so that a multiple-beam antenna is manufactured at a low cost. In addition, by changing an angle of one end of the feeding portion, a polarization angle can be adjusted for each location, thereby facilitating application to many types of apparatuses.

In a more preferred embodiment of the present invention, the waveguide is mounted on the board, and the other end of the feeding portion is mounted on the substrate.

Further, in a more preferred embodiment of the present invention, each satellite has a linearly polarized wave, and the feeding portion includes feeding portions respectively for horizontally and vertically polarized waves.

The waveguide includes a vertical hole formed for insertion of the feeding portion for vertically polarized wave, and a horizontal hole formed for insertion of the feeding portion for horizontally polarized wave. The end of the feeding portion for vertically polarized wave, which is to be inserted to the vertical hole of the waveguide, is angled with respect to the vertical direction for adjustment. The end of the feeding portion for horizontally polarized wave, which is to be inserted to the horizontal hole of the waveguide, is angled with respect to the horizontal direction for adjustment. The horizontal and vertical holes formed in each waveguide are arranged to form about 90°.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

It is noted that the present invention is described as being applied to a multiple-beam antenna receiving linearly polarized waves transmitted from two different communications satellites JCSAT-3 and JCSAT-4.

JCSAT-3 and JCSAT-4 are up in the air at locations of east longitudes of 128° and 124°, respectively. Because of proximity of these satellites, their focal points are also close. Thus, the same parabolic antenna can receive radio waves from these satellites. It is noted that polarization displacements caused by satellites are −2.5° and +2.5°, respectively for JCSAT-3 and JCSAT-4. These values are average values to cover all areas in Japan. Thus, mutually orthogonal planes of polarization must be adjusted.

Figure 1:
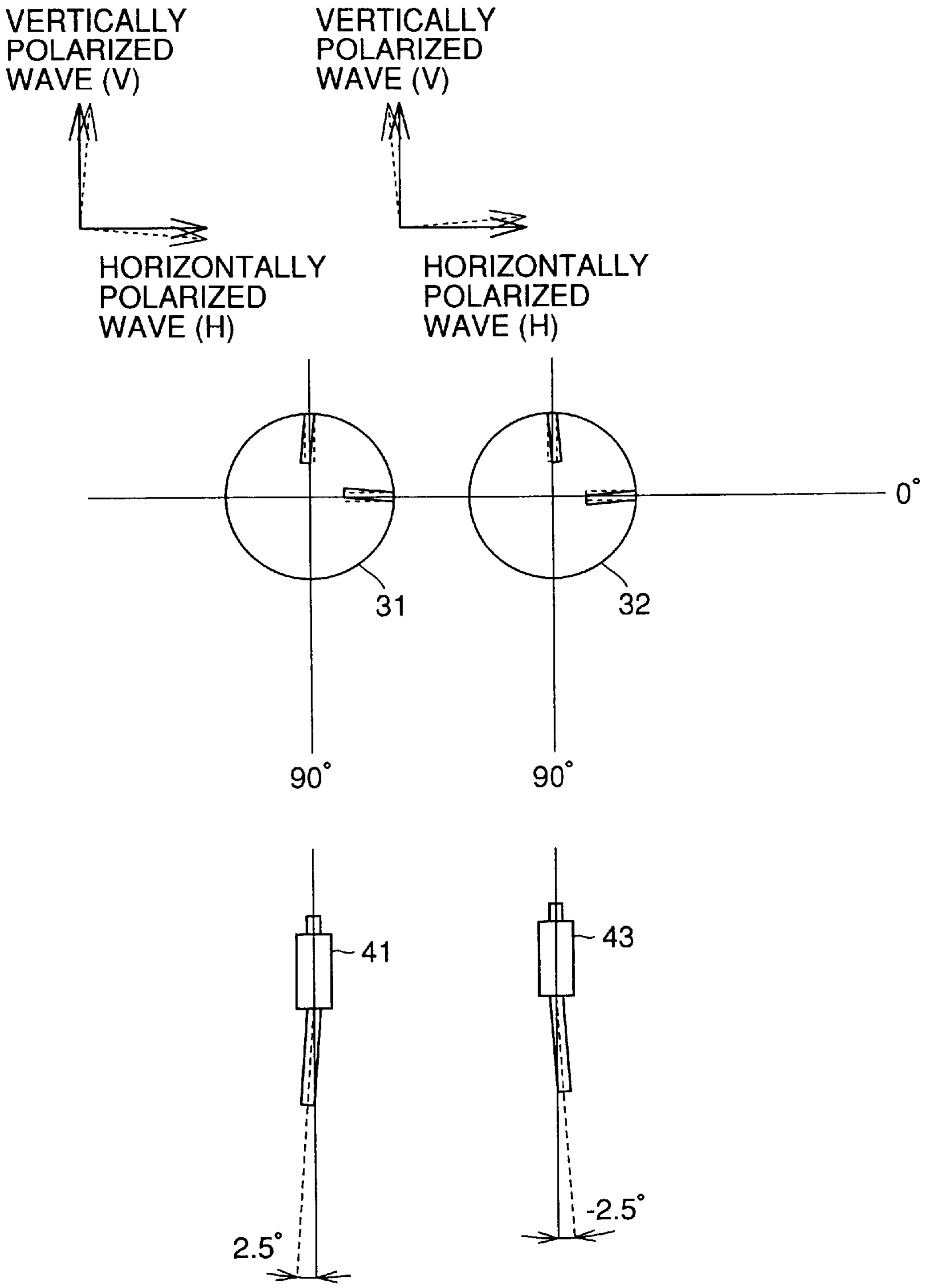
FIG. 1 is a diagram showing a method of adjusting displacement in planes of polarization according to one embodiment of the present invention.

Accordingly, in one embodiment of the present invention, as shown in FIG. 1, probes 41, 43 as feeding portions which are inserted to circular waveguides 31, 32 provided correspondingly to radio waves from two satellites are angled, so that displacements of vertical and horizontal planes of polarization are adjusted.

Figure 2:
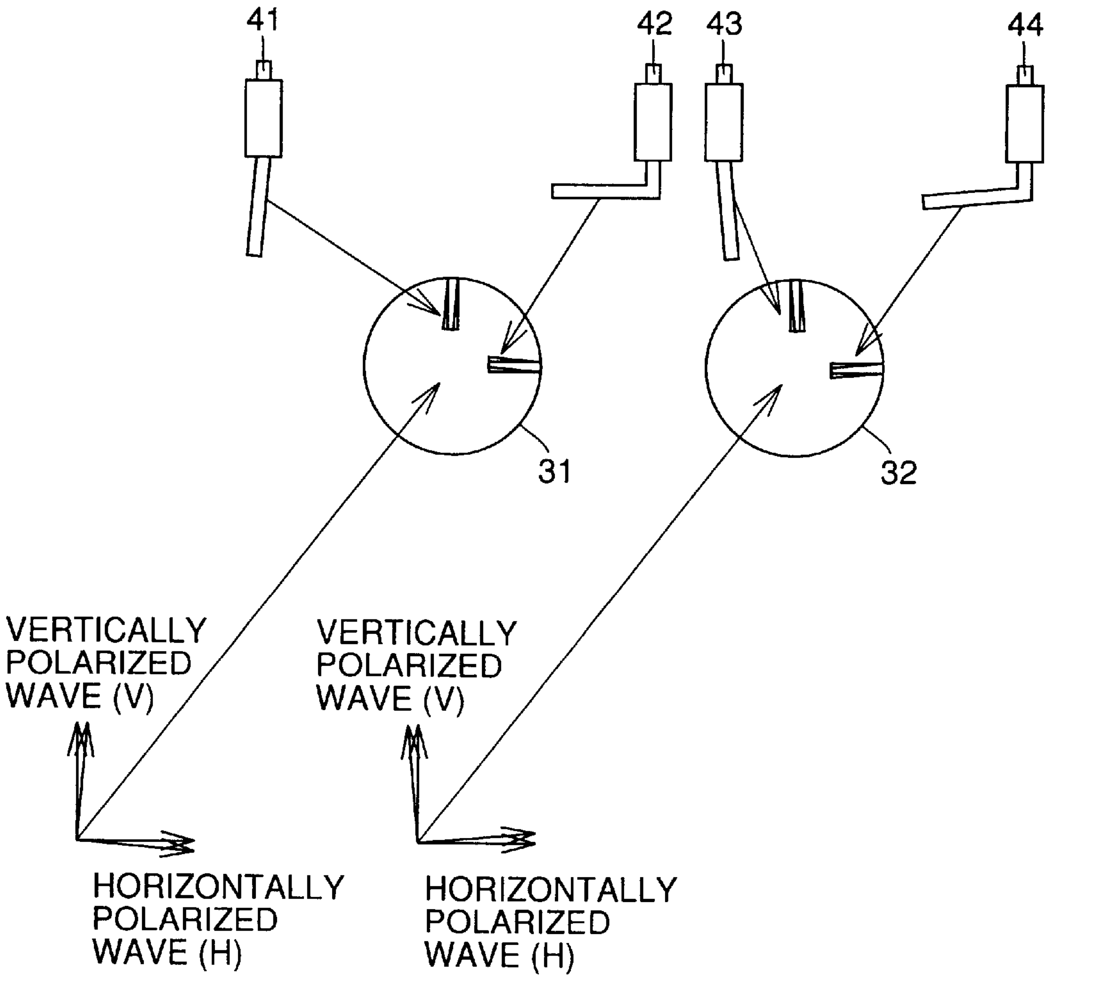
FIG. 2 is a diagram shown in conjunction with a method of feeding a circular waveguide according to one embodiment of the present invention.

FIG. 2 is a diagram shown in conjunction with a method of adjusting a displacement of planes of polarization according to one embodiment of the present invention. As shown in FIG. 2, probes 41 and 42, respectively for vertically and horizontally polarized waves, are inserted to one circular waveguide 31. Probes 43 and 44, respectively for vertically and horizontally polarized waves, are inserted to the other circular waveguide 32. One end of each of probes 41 and 43 for vertically polarized waves is angled with respect to the vertical direction for adjustment. One end of each of probes 42 and 44 for horizontally polarized waves is angled with respect to the horizontal direction for adjustment.

Figure 8:
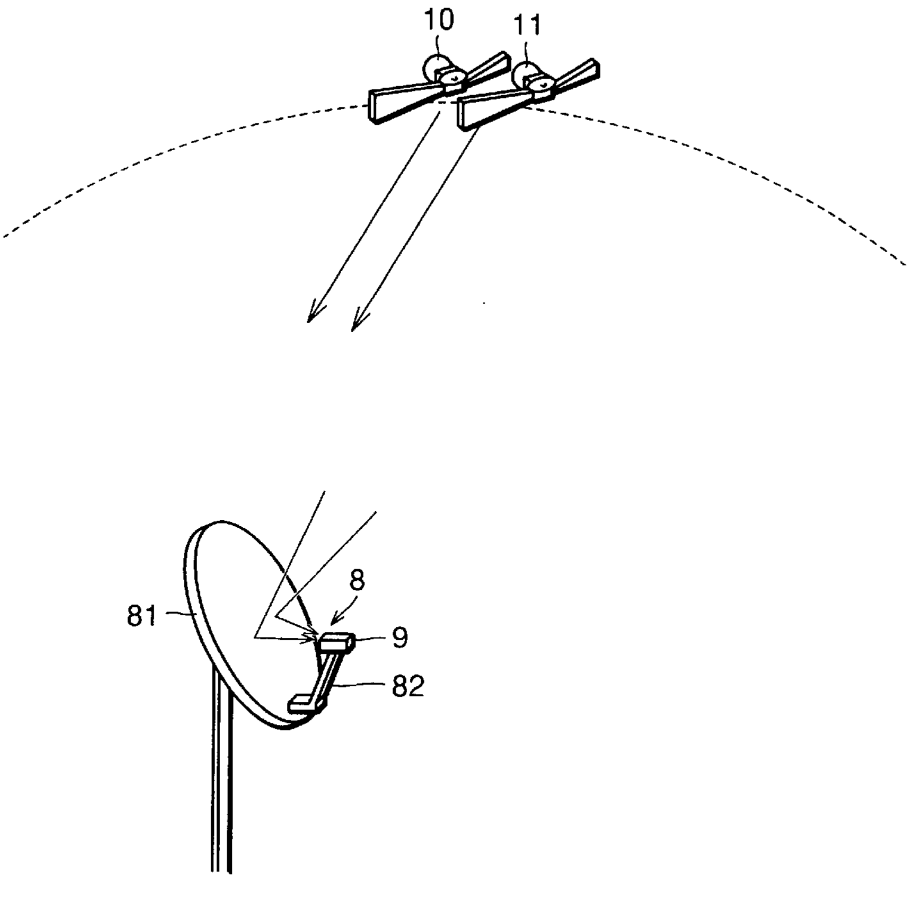
FIG.8 PRIOR ART
FIG. 8 is a diagram showing a parabolic antenna receiving radio waves from two communications satellites.
Figure 9:
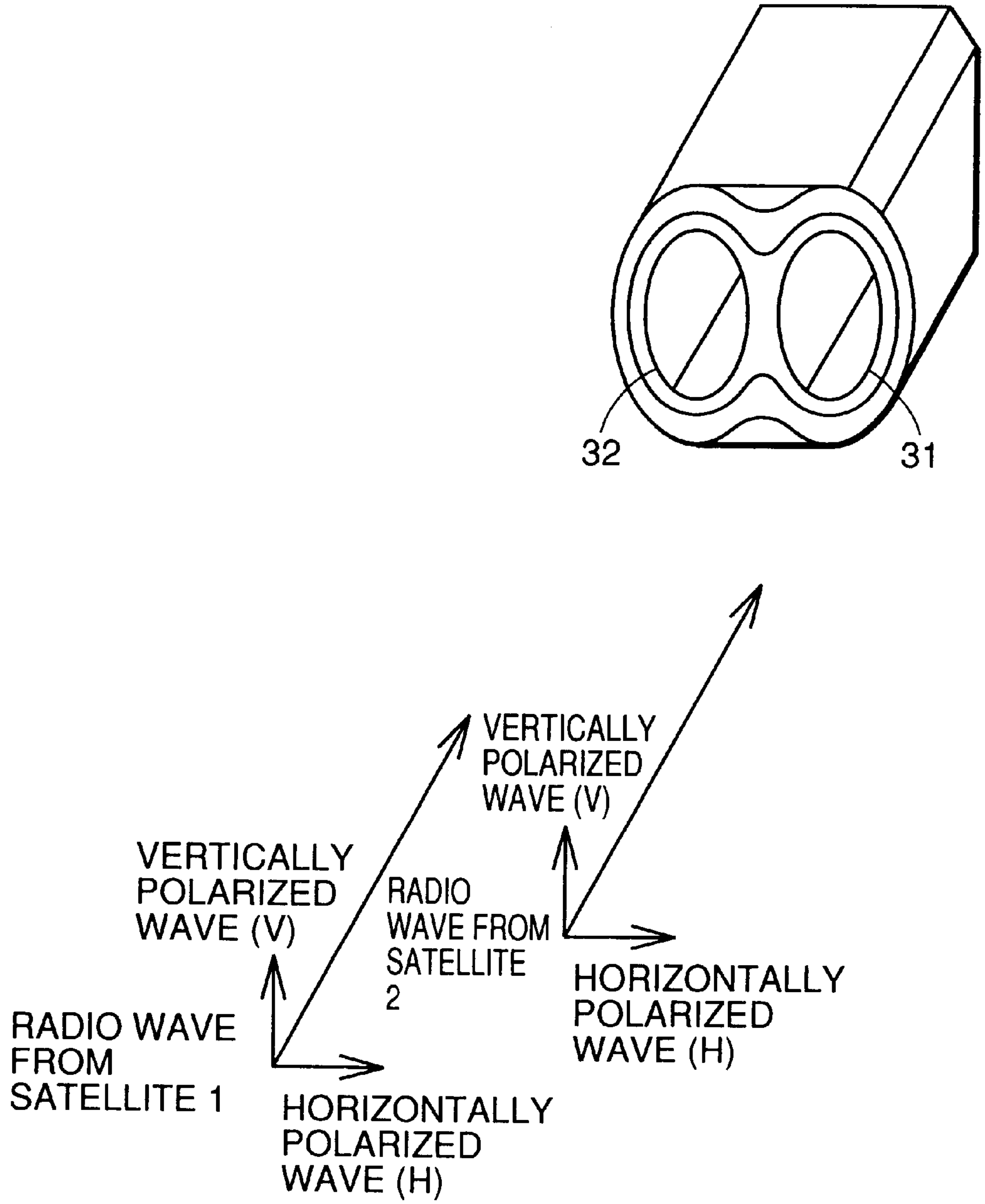
FIG.9 PRIOR ART
FIG. 9 is a diagram showing two circular waveguides mounted on a down converter.

These adjustment angles for probes 41 to 44 are preliminary determined to eliminate polarization displacement. Thus, the polarization displacement is adjusted by changing angles between circular waveguides 31, 32 and probes 41 to 44 for feeding, so that reflection within circular waveguides 31, 32 is reduced, a characteristic of orthogonal horizontal and vertical polarization waves is enhanced, and the best receiving condition is achieved. For example, the linearly polarized waves transmitted from two different communications satellites such as the above mentioned JCSAT-3 and JCSAT-4 are reflected by parabolic antenna 1 shown in FIG. 8. The waveguide positioned at a focal point with respect to each satellite is integrally formed with a low noise down converter, so that input signals of the satellites are separated. In addition, because of the proximity of the satellites, the focal points of the satellites are close and therefore the waveguides can closely be arranged.

The polarization displacement caused by the satellites are in average −2.5° and +2.5° respectively for JCSAT-3 and JCSAT-4, covering all areas in Japan. Thus, the orthogonal planes of polarization waves must be adjusted. The polarization displacement is adjusted by angling probes 41, 43 shown in FIG. 2 by 2.5° with respect to the vertical direction and angling probes 42, 44 by 2.5° with respect to the horizontal direction. Thus, the polarization displacement is adjusted and a property of reflecting inputs to circular waveguides 31 and 32 is optimized. As a result, degradation of the orthogonal polarization characteristic of a dual-beam low noise down converter which is difficult to be adjusted to rotate the circular waveguide, and degradation of input VSWR are prevented.

Figure 3:
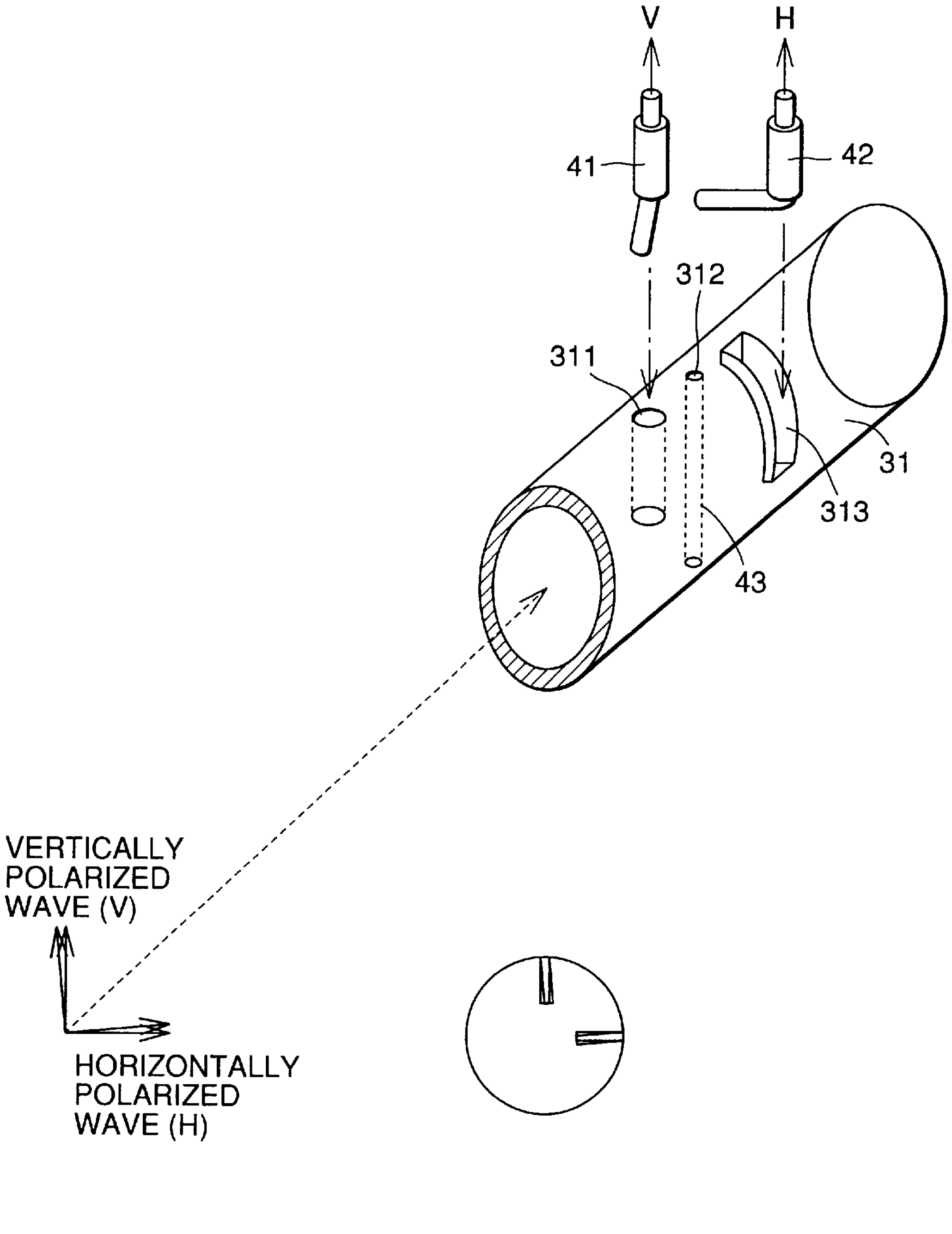
FIG. 3 is a diagram showing a structure of the waveguide according to one embodiment of the present invention.

FIG. 3 is a diagram showing a more specific example of the waveguide of one embodiment of the present invention. Although only one circular waveguide 31 is shown in FIG. 3, the other waveguide 32 is similarly manufactured.

Referring to FIG. 3, a circular waveguide 31 is provided with a vertical hole 311, into which probe 41 for vertically polarized wave is inserted. In addition, a hole 312 is formed behind hole 311 in the vertical direction, into which a reflecting bar 43 is inserted. Further, behind reflecting bar 43, an outer surface of circular waveguide 31 is provided with a hole an angle of 45°, into which probe 42 for horizontally polarized wave is inserted. Probes 41, 42 are formed of metal pins partially coated with resin.

As shown in FIG. 3, it is essentially desirable that the waveguide to which the radio wave from JCSAT-4 is input can receive a horizontally polarized wave at 0° with respect to the waveguide when the waveguide is horizontally placed. In this case, a vertically polarized wave can be received by the feeding portion at a position of 90° (at a right angle).

However, in a multiple-beam LNB integrally formed with the waveguide, because of a difference in polarization angles input to the waveguide due to a positional relationship between parabolic antenna 8 and the LNB, the probe cannot be set at 0° and 90°. Thus, in the present embodiment, for example, a tilt of probe 41 receiving the vertically polarized wave from JCSAT-4 is set to +2.5° with respect to the vertical direction. A tilt of probe 43 receiving a vertically polarized wave from JCSAT-3 is set to −2.5° with respect to the vertical direction.

Further, when fine adjustment is performed for each area or polarization displacement itself is different in nature from the above described case because a satellite per se is different, if a probe for the polarization displacement is prepared as a separate component, the polarization displacement can be variably adjusted by suitably changing the probe.

Figure 4:
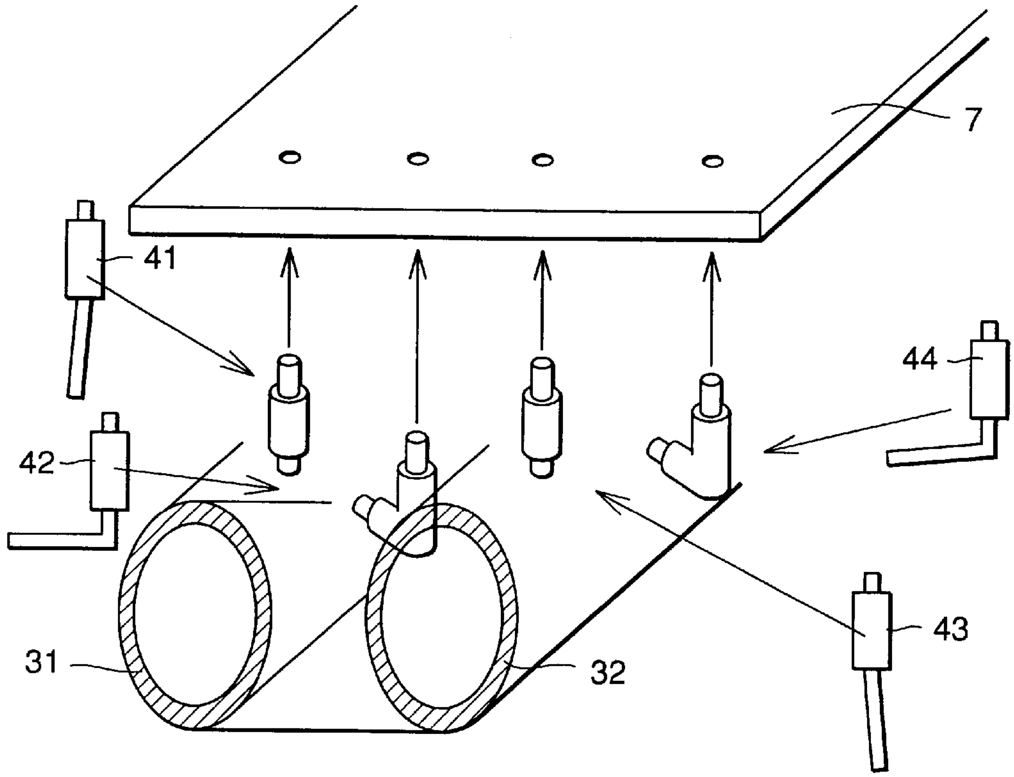
FIG. 4 is a diagram shown in conjunction with a method of mounting a probe on a board of a down converter.
Figure 5:
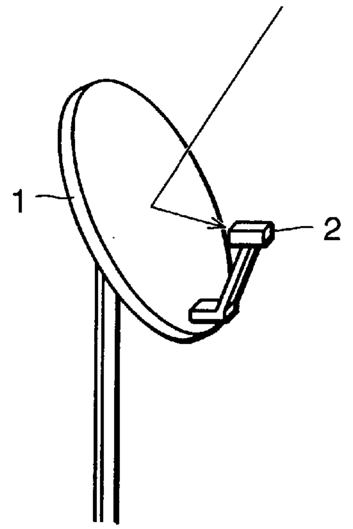
FIG.5 PRIOR ART
FIG. 5 is an illustration showing a parabolic antenna receiving a radio wave output from a conventional satellite.
Figure 6:
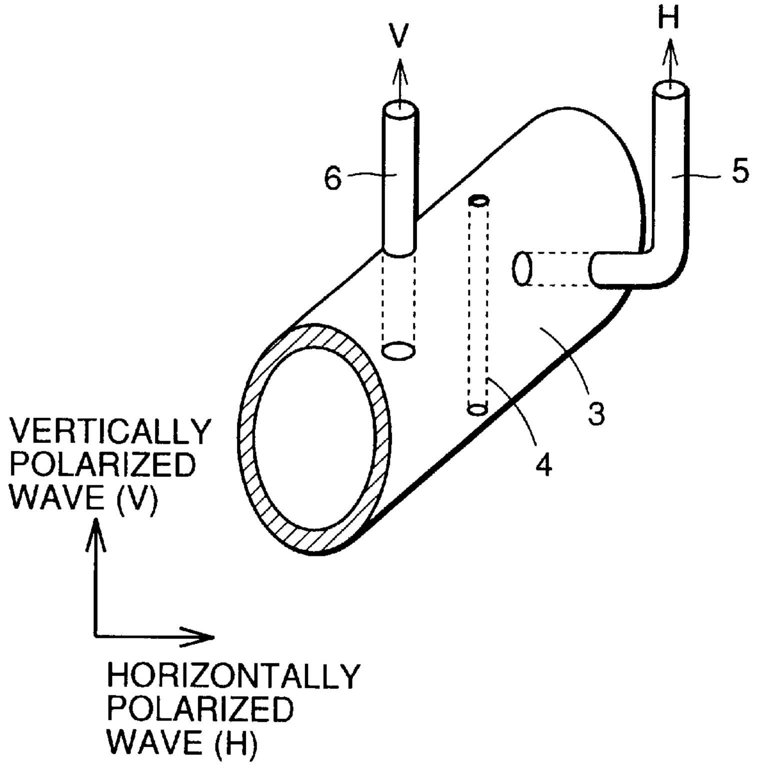
FIG.6 PRIOR ART
FIG. 6 is a perspective view showing a circular waveguide of a conventional down converter.
Figure 7:
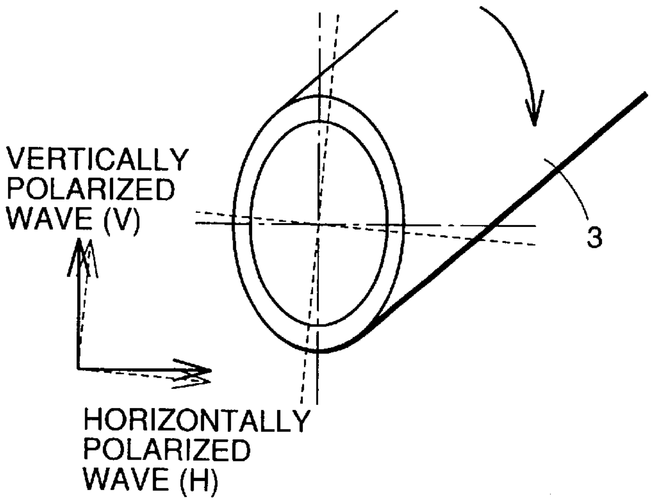
FIG.7 PRIOR ART
FIG. 7 is a diagram shown in conjunction with a method of adjusting polarization displacement by a circular waveguide.

FIG. 4 is a diagram shown in conjunction with a method of mounting a probe on the board of the down converter. As described with reference to FIG. 3 in the above, the other ends of probes 41, 42 mounted on circular waveguide 31 protrudes from resin portions, and the protruding portions are inserted to, electrically connected to and mechanically mounted on a board 7 via a through hole formed therein. Each of probes 41 and 42 is held vertically with respect to board 7 by the resin portions, so that a mounting condition is stabled.

Probes 43, 44 of the other circular waveguide 32 are similarly mounted on board 7.

It is noted that if various probes of different angles are preliminary formed for adjustment of polarization displacement by changing angles of the probes, a cost reduction is achieved. In addition, adjustment of polarization displacement and angle change can readily be performed in accordance with a location at which the antenna is installed.

In the above described embodiment, the present invention has been described as the circular waveguide. However, the present invention is not limited to this and may be applied to a rectangular waveguide.

As in the foregoing, according to one embodiment of the present invention, two waveguides are integrally formed with the down converter for converting radio waves from two satellites to linearly polarized waves. Further, the feeding portion, one end of which has been bent to have a prescribed angle for adjusting polarization displacement, is inserted to each waveguide. Thus, polarization displacement caused by a locational difference can be adjusted, degradation of performance is prevented, and a multiple-beam antenna can be manufactured with a low cost. In addition, if the angle at one end of the feeding portion is variable, the polarization angle can be adjusted in accordance with a location and the invention can readily be applied to various types of apparatuses.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiple-beam antenna receiving radio waves from a plurality of satellites by one down converter mounted on a parabolic reflector and switching respective input signals by a signal selected by a tuner for output, said down converter including:

a plurality of waveguides for receiving the radio waves from said plurality of satellites at an opening and converting them to linearly polarized waves;

a feeding portion inserted to each of said waveguides and having one end bent at a prescribed angle for adjusting polarization displacement, wherein said satellite uses a linearly polarized wave, and said feeding portion includes feeding portions for horizontally and vertically polarized waves, wherein said waveguide includes a vertical hole for insertion of said feeding portion for said vertically polarized wave, and a horizontal hole for insertion of said feeding portion for horizontally polarized wave, said feeding portion for vertically polarized wave has an end inserted to said vertical hole of said waveguide and bent to have an angle for adjustment with respect to the vertical direction, and said feeding portion for horizontally polarized wave has an end inserted to said vertical hole of said waveguide and bent to have an angle for adjustment with respect to the horizontal direction.

2. The multiple-beam antenna according to claim 1, wherein each of said waveguides is mounted on a board and the other end of said feeding portion is mounted on said board.

3. The multiple-beam antenna according to claim 1, wherein said horizontal and vertical holes in said waveguide are arranged to have an angle of approximately 90° therebetween.

* * * * *